No. 786,142.

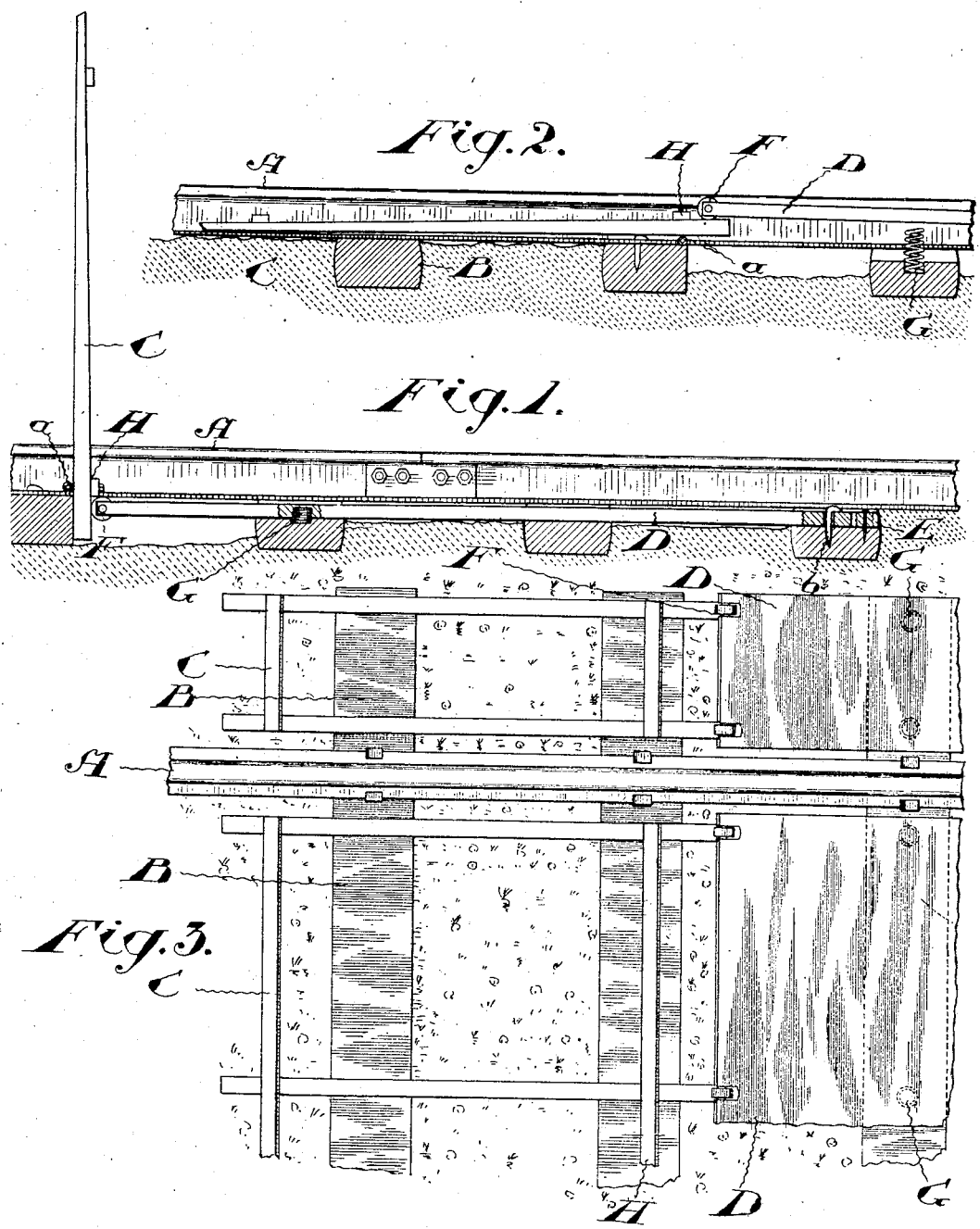

Patented March 28, 1905.

UNITED STATES PATENT OFFICE.

THOMAS K. McQUEEN, OF ELORA, CANADA, ASSIGNOR OF ONE-HALF TO ABRAHAM GROVES, OF FERGUS, CANADA.

CATTLE-GUARD.

SPECIFICATION forming part of Letters Patent No. 786,142, dated March 28, 1905.

Application filed September 6, 1904. Serial No. 223,412.

*To all whom it may concern:*

Be it known that I, THOMAS K. McQUEEN, of the village of Elora, in the county of Wellington, Province of Ontario, Canada, have invented certain new and useful Improvements Cattle-Guards, of which the following is a specification.

The object of my invention is to devise a cattle-guard which while thoroughly effective will be simple and cheap to construct. My guard is of that type in which a gate is elevated by the depression of a platform; and my invention consists, essentially, in the details of the operative connections of the parts, substantially as hereinafter more specifically described and then definitely claimed.

Figure 1 is a side elevation of my device, partly in section, showing the gate raised. Fig. 2 is a side elevation of a part of the same, showing the gate in its normal position. Fig. 3 is a plan view of Fig. 2, showing one gate and guard and part of another set.

In the drawings like letters of reference indicate corresponding parts in the different figures.

A represents the rails of a railway-track, and B the ties.

C is a gate, of any suitable construction, pivoted at *a* to one of the ties. As shown in Figs. 1 and 2, the pivot is located close to the lower or inner end of the gate and also adjacent to one of the edges of the tie, so that when the gate is vertical, as shown in Fig. 1, its forward edge engages the edge of the tie, which thus serves as a stop to limit the upward swing of the gate. I prefer to locate the pivots so that the gate is in a substantially vertical position when in contact with the stop. I do not desire to confine myself to the precise form of pivot or hinge; but I prefer to employ eyebolts or staples, as shown.

D is a platform, pivoted at its rear end to one of the ties. While any form of pivot might be employed, for the sake of simplicity or cheapness I secure a slat E to the tie, the end of the platform resting against the slat. This would form a sufficient pivot for most purposes; but as a matter of precaution I hold the end in place by driving railway-spikes *b* into the tie through loose holes formed in the platform. These hold the end of the platform in position without interfering with its free movement. The other end of the platform rests upon the lower or rear end of the gate behind the pivot. While the end of the platform might contact directly with the gate, to avoid wear I prefer to employ friction-rollers F, journaled in the end of the platform and engaging the side bars of the gate.

Between the platform and one of the ties I locate coil-springs G, which tend to maintain the platform in its raised position, and consequently the gate down.

From the construction described it follows that when a beast steps upon the platform the gate will be thrown up until the forward edge of its lower end engages the side of the tie. At this time the platform D has descended flat upon the ties, so that its point of engagement with the gate is substantially below the line between the pivot of the gate and the pivot of the rear end of the platform. The gate is thus securely held in position and cannot move farther, either forwardly or rearwardly. As the gate is now substantially vertical, it is necessary to provide means to insure its starting on its return to its normal horizontal position. I therefore secure to its sides the contact-piece H, which is so located that when the gate is in its vertical position the contact-piece engages the upper side of the end of the platform or friction-rollers, if these be employed. Thus after the beast has stepped back off the platform the platform, rising, engages the contact-piece and throws the gate over. The gate then resumes its normal position by virtue of its own weight, the platform being lifted by the springs.

Of course if the gate be not raised to an absolutely vertical position and if it be of sufficient weight the springs might be dispensed with; but I prefer to use them as adding to the certainty of operation of the device.

As the platform descends to the level of the ties, as shown in Fig. 1, and as the contact-piece H engages its upper surface, it is not absolutely necessary that the gate engage the edge of the tie, as shown in Fig. 2; but I consider that the security of the apparatus is enhanced by having the gate so contact with the tie and by also having the contact-piece H to engage the upper surface of the platform.

My object has been to devise a cattle-guard which, while effective, will be exceedingly cheap in construction. It will readily be seen that the construction described is of the simplest description and can be quickly made without skilled labor in a short time and with the use of machinery of the simplest possible description. A complete cattle-guard can, indeed, be manufactured at a prime cost of about one dollar for each of the three sections necessary to protect a crossing.

What I claim as my invention is—

1. In a cattle-guard a gate horizontally pivoted near its lower or inner end and transversely of the tracks; a stop with which the lower end of the gate is adapted to engage to limit its upward swing, in combination with a platform horizontally pivoted at one end transversely of the tracks, the other end engaging the end of the gate behind or below its pivot, the platform being so located and proportioned that when depressed its end comes below the line of the pivot of the gate and platform and holds the former securely between the stop and platform end; and a spring tending to raise the platform, substantially as described.

2. In a cattle-guard a gate horizontally pivoted near its lower or inner end and transversely of the tracks; a stop with which the lower end of the gate is adapted to engage to limit its upward swing, in combination with a platform horizontally pivoted at one end transversely of the tracks, the other end engaging the end of the gate behind or below its pivot, the platform being so located and proportioned that when depressed its end comes below the line of the pivot of the gate and platform and holds the former securely between the stop and platform end; a spring tending to raise the platform; and a contact-piece on the back or upper side of the gate adapted to engage the upper side of the end of the platform when the latter is depressed to its lowest position, substantially as described.

3. In a cattle-guard a gate horizontally pivoted near its lower or inner end and transversely of the tracks; in combination with a platform horizontally pivoted at one end transversely of the tracks, the other end resting on the end of the gate behind or below its pivot; a spring tending to raise the platform; and a contact-piece on the back or upper side of the gate adapted to engage the upper side of the end of the platform when the latter is depressed to its lowest position, substantially as described.

4. In a cattle-guard a gate horizontally pivoted near its lower or inner end and transversely of the tracks in combination with a platform having one end resting on a tie; a slat secured to the tie behind the end of the platform and serving as a pivot, the other end engaging the end of the gate behind or below its pivot, the platform being so located and proportioned that when depressed its end comes below the line of the pivot of the gate and platform and holds the former securely between the stop and platform end; and a spring tending to raise the platform, substantially as described.

5. In a cattle-guard a gate horizontally pivoted near its lower or inner end and transversely of the tracks; a stop with which the lower end of the gate is adapted to engage to limit its upward swing, in combination with a platform horizontally pivoted at one end transversely of the tracks, the other end engaging the end of the gate behind or below its pivot, the platform being so located and proportioned that when depressed its end comes below the line of the pivot of the gate and the platform and holds the former securely between the stop and platform end; and a contact-piece on the back or upper side of the gate adapted to engage the upper side of the end of the platform when the latter is depressed to its lowest position, substantially as described.

6. In a cattle-guard a gate horizontally pivoted near its lower or inner end and transversely of the tracks; in combination with a platform horizontally pivoted at one end transversely of the tracks, the other end resting on the end of the gate behind or below its pivot; and a contact-piece on the back or upper side of the gate adapted to engage the upper side of the end of the platform when the latter is depressed to its lowest position, substantially as described.

7. In a cattle-guard a gate horizontally pivoted near its lower or inner end and transversely of the tracks in combination with a platform having one end resting on a tie; and a slat secured to the tie behind the end of the platform and serving as a pivot, the other end engaging the end of the gate behind or below its pivot, the platform being so located and proportioned that when depressed its end comes below the line of the pivot of the gate and platform and holds the former securely between the stop and platform end, substantially as described.

Toronto, August 25, 1904.

THOMAS K. McQUEEN.

In presence of—
J. EDW. MAYBEE,
P. R. JONES.